C. SEYMOUR.
DEVICE FOR BALANCING FLY WHEELS, &c.
No. 189,506. Patented April 10, 1877.
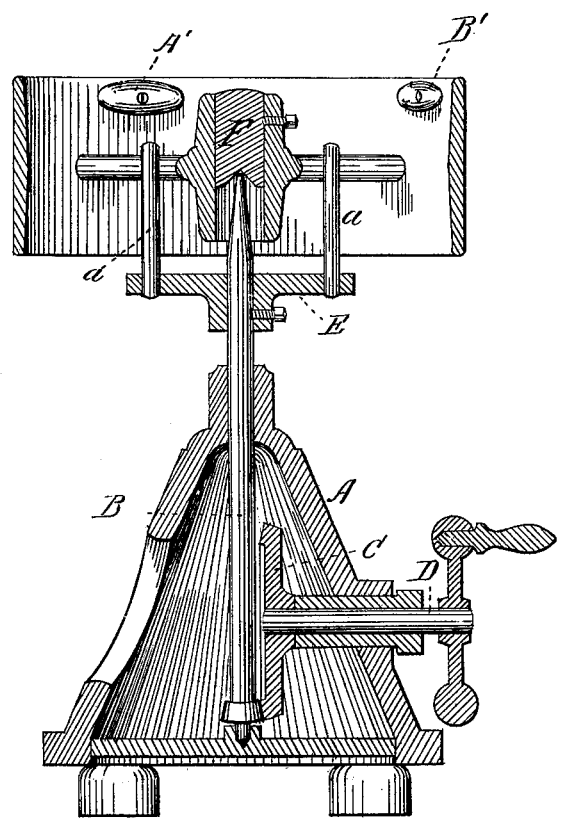
Witnesses:
P. Kettering
I. G. Brown
Inventor
Charles Seymour.

UNITED STATES PATENT OFFICE.

CHARLES SEYMOUR, OF DEFIANCE, OHIO.

IMPROVEMENT IN DEVICES FOR BALANCING FLY-WHEELS, &c.

Specification forming part of Letters Patent No. 189,506, dated April 10, 1877; application filed December 20, 1876.

*To all whom it may concern:*

Be it known that I, CHARLES SEYMOUR, of the city and county of Defiance, and State of Ohio, have invented a new and useful Apparatus for Use in Balancing Pulleys, Fly-Wheels, Cutter-Heads, and other revolving parts of machinery; and I do hereby declare that the following is a full and exact description thereof.

The accompanying drawing shows a sectional elevation of an apparatus for rotating pulleys, &c., for the purpose of balancing them.

The apparatus consists of a hollow conical base, A, a vertical spindle, B, rotated by a gear, C, and hand crank-shaft D; also a yoke, E, which is vertically adjustable on the spindle B, and provided with pins or arms $a$; also a step-block, F, which is designed to be placed and secured in the eye of the pulley. The pulley to be balanced is supported upon the spindle B, as shown, and the arms $a$ engage the spokes of the pulley, but without interfering with its freedom of oscillatory movement, according to its gravitating tendencies.

The process of balancing consists of rotating the object to be balanced, and marking, with chalk, pencil, or other means, upon any surface which is parallel with the plane in which it is desired to make such object revolve, and upon such indicated light side place the balance-weight A', of sufficient weight to correct the tendency to "run out" in the direction marked, or cut away or otherwise lighten the heavy part of the object opposite such mark. Rotate again, mark as before, and readjust the balance-weight, always approaching the mark, unless the mark occurs at one-fourth of the circumference of the object from the place first marked, in which case an additional weight, B', should be placed at such last mark. By like process additional weights may be placed at all light parts, always with the care that the object to be balanced be so weighted that it do not "throw" in a line parallel with the plane of rotation.

What I claim is—

For use in the process of balancing pulleys, &c., the apparatus consisting of a spindle, a supporting base or frame, and a gear for rotating said spindle, a yoke, E, vertical arms, and a step-block, F, all constructed as shown and described.

CHARLES SEYMOUR.

Witnesses:
P. KETTENRING,
F. G. BROWN.